(12) United States Patent
Sheen

(10) Patent No.: US 9,813,829 B2
(45) Date of Patent: *Nov. 7, 2017

(54) AUDIO SYNCHRONIZATION AMONG PLAYBACK DEVICES USING OFFSET INFORMATION

(71) Applicant: Sonos, Inc., Santa Barbara, CA (US)

(72) Inventor: Timothy W. Sheen, Brighton, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,972

(22) Filed: Nov. 3, 2016

(65) Prior Publication Data

US 2017/0064472 A1     Mar. 2, 2017

Related U.S. Application Data

(63) Continuation of application No. 15/041,101, filed on Feb. 11, 2016, now Pat. No. 9,538,300, which is a
(Continued)

(51) Int. Cl.
*H04B 3/00* (2006.01)
*H04R 27/00* (2006.01)
(Continued)

(52) U.S. Cl.
CPC ......... *H04R 27/00* (2013.01); *H04N 21/8113* (2013.01); *H04R 29/007* (2013.01);
(Continued)

(58) Field of Classification Search
CPC ...... H04R 27/00; H04R 29/007; H04R 29/00; H04R 29/001; H04R 2227/003; H04R 2227/005
(Continued)

(56) References Cited

U.S. PATENT DOCUMENTS

| 4,816,989 A | 3/1989 | Finn et al. |
| 5,440,644 A | 8/1995 | Farinelli et al. |

(Continued)

FOREIGN PATENT DOCUMENTS

| EP | 0251584 A2 | 1/1988 |
| EP | 0672985 A1 | 9/1995 |

(Continued)

OTHER PUBLICATIONS

"Denon 2003-2004 Product Catalog," Denon, 2003-2004, 44 pages.
(Continued)

*Primary Examiner* — Disler Paul
(74) *Attorney, Agent, or Firm* — McDonnell Boehnen Hulbert & Berghoff LLP

(57) ABSTRACT

Embodiments are provided for audio synchronization of one or more playback devices using offset information. A playback device may join a synchrony group upon a command, where the synchrony group may have a group coordinator that provides timing information for the group. In one case, the playback device may retrieve offset information from memory storage, where the information represents the offset between a clock of the playback device and the clock of the group coordinator. In another case, the playback device may determine that the offset information is not available in storage and as a result, the offset information may be computed. In one instance, the offset information may be computed using other offsets obtained from storage, such as offsets between other devices in the synchrony group. In another instance, the offset information may be computed using SNTP polling.

20 Claims, 14 Drawing Sheets

Related U.S. Application Data continuation of application No. 14/164,971, filed on Jan. 27, 2014, now Pat. No. 9,313,591.

(51) Int. Cl.
  *H04N 21/81* (2011.01)
  *H04R 29/00* (2006.01)

(52) U.S. Cl.
  CPC ............ *H04R 29/00* (2013.01); *H04R 29/001* (2013.01); *H04R 2227/003* (2013.01); *H04R 2227/005* (2013.01)

(58) Field of Classification Search
  USPC ................................................ 381/77, 79, 82
  See application file for complete search history.

(56) References Cited

U.S. PATENT DOCUMENTS

| | | |
|---|---|---|
| 5,491,839 A | 2/1996 | Schotz |
| 5,668,884 A | 9/1997 | Clair, Jr. et al. |
| 5,673,323 A | 9/1997 | Schotz et al. |
| 5,761,320 A | 6/1998 | Farinelli et al. |
| 5,815,689 A | 9/1998 | Shaw et al. |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 6,009,457 A | 12/1999 | Moller |
| 6,031,818 A | 2/2000 | Lo et al. |
| 6,032,202 A | 2/2000 | Lea et al. |
| 6,128,318 A | 10/2000 | Sato |
| 6,157,957 A | 12/2000 | Berthaud |
| 6,175,872 B1 | 1/2001 | Neumann et al. |
| 6,185,737 B1 | 2/2001 | Northcutt et al. |
| 6,199,169 B1 | 3/2001 | Voth |
| 6,256,554 B1 | 7/2001 | DiLorenzo |
| 6,324,586 B1 | 11/2001 | Johnson |
| 6,332,147 B1 | 12/2001 | Moran et al. |
| 6,351,821 B1 | 2/2002 | Voth |
| 6,404,811 B1 | 6/2002 | Cvetko et al. |
| 6,469,633 B1 | 10/2002 | Wachter |
| 6,487,296 B1 | 11/2002 | Allen et al. |
| 6,522,886 B1 | 2/2003 | Youngs et al. |
| 6,526,325 B1 | 2/2003 | Sussman et al. |
| 6,598,172 B1 | 7/2003 | VanDeusen et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 7,007,106 B1 | 2/2006 | Flood et al. |
| 7,047,308 B2 | 5/2006 | Deshpande |
| 7,115,017 B1 | 10/2006 | Laursen et al. |
| 7,130,608 B2 | 10/2006 | Hollstrom et al. |
| 7,130,616 B2 | 10/2006 | Janik |
| 7,143,939 B2 | 12/2006 | Henzerling |
| 7,185,090 B2 | 2/2007 | Kowalski et al. |
| 7,206,367 B1 | 4/2007 | Moore |
| 7,209,795 B2 | 4/2007 | Sullivan et al. |
| 7,236,773 B2 | 6/2007 | Thomas |
| 7,295,548 B2 | 11/2007 | Blank et al. |
| 7,312,785 B2 | 12/2007 | Tsuk et al. |
| 7,324,857 B2 | 1/2008 | Goddard |
| 7,333,519 B2 | 2/2008 | Sullivan et al. |
| 7,372,846 B2 | 5/2008 | Zwack |
| 7,392,102 B2 | 6/2008 | Sullivan et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,656,751 B2 * | 2/2010 | Rischar ................. H04J 3/0697 368/46 |
| 7,657,910 B1 | 2/2010 | McAulay et al. |
| 7,742,740 B2 | 6/2010 | Goldberg et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 * | 7/2012 | Millington ............ H04J 3/0664 709/205 |
| 8,483,853 B1 | 7/2013 | Lambourne |
| 8,930,006 B2 * | 1/2015 | Haatainen ............. H04J 3/0667 700/94 |
| 2001/0032188 A1 | 10/2001 | Miyabe et al. |
| 2001/0042107 A1 | 11/2001 | Palm |
| 2002/0002562 A1 | 1/2002 | Moran et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0073228 A1 | 6/2002 | Cognet et al. |
| 2002/0090914 A1 | 7/2002 | Kang et al. |
| 2002/0112244 A1 | 8/2002 | Liou et al. |
| 2002/0124097 A1 | 9/2002 | Isely et al. |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2003/0035444 A1 | 2/2003 | Zwack |
| 2003/0041173 A1 | 2/2003 | Hoyle |
| 2003/0066094 A1 | 4/2003 | Van Der Schaar et al. |
| 2003/0099212 A1 | 5/2003 | Anjum et al. |
| 2003/0126211 A1 | 7/2003 | Anttila et al. |
| 2003/0157951 A1 | 8/2003 | Hasty, Jr. |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0231871 A1 | 12/2003 | Ushimaru |
| 2004/0001591 A1 | 1/2004 | Mani et al. |
| 2004/0024478 A1 | 2/2004 | Hans et al. |
| 2004/0024925 A1 | 2/2004 | Cypher et al. |
| 2004/0027166 A1 | 2/2004 | Mangum et al. |
| 2004/0043495 A1 | 3/2004 | Stokes et al. |
| 2004/0203378 A1 | 10/2004 | Powers |
| 2004/0249982 A1 | 12/2004 | Arnold et al. |
| 2004/0252400 A1 | 12/2004 | Blank et al. |
| 2005/0010691 A1 | 1/2005 | Oyadomari et al. |
| 2005/0058149 A1 | 3/2005 | Howe |
| 2005/0081213 A1 | 4/2005 | Suzuoki et al. |
| 2007/0142944 A1 | 6/2007 | Goldberg et al. |
| 2008/0226094 A1 | 9/2008 | Rutschman |
| 2009/0157905 A1 | 6/2009 | Davis |
| 2011/0015769 A1 | 1/2011 | Haatainen |
| 2013/0022222 A1 | 1/2013 | Zschau et al. |
| 2013/0336498 A1 | 12/2013 | Haatainen |
| 2014/0088742 A1 | 3/2014 | Srinivasan et al. |
| 2014/0185842 A1 | 7/2014 | Kang et al. |

FOREIGN PATENT DOCUMENTS

| | | |
|---|---|---|
| EP | 1111527 A2 | 6/2001 |
| EP | 1389853 A1 | 2/2004 |
| WO | 9525313 | 9/1995 |
| WO | 9961985 | 12/1999 |
| WO | 0153994 | 7/2001 |
| WO | 03093950 A2 | 11/2003 |

OTHER PUBLICATIONS

United States Patent and Trademark Office, U.S Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

(56) References Cited

OTHER PUBLICATIONS

Yamaha DME Designer 3.5 setup manual guide; copyright 2004, 16 pages.
Yamaha DME Designer 3.5 User Manual; Copyright 2004, 507 pages.
Akyildiz et al., "Multimedia Group Synchronization Protocols for Integrated Services Networks," IEEE Journal on Selected Areas in Communications, 1996 pp. 162-173, vol. 14, No. 1.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Benslimane Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International Conference on Multimedia Computing and Systems, 1996, pp. 372-381.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bretl W.E., et al., MPEG2 Tutorial [online], 2000 [retrieved on Jan. 13, 2009] Retrieved from the Internet:, pp. 1-23.
Dell, Inc. "Dell Digital Audio Receiver: Reference Guide," Jun. 2000, 70 pages.
Dell, Inc. "Start Here," Jun. 2000, 2 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Searching Authority, International Search Report dated Aug. 1, 2008, in connection with International Application No. PCT/US2004/023102, 5 pages.
Ishibashi et al., "A Group Synchronization Mechanism for Live Media in Multicast Communications," IEEE Global Telecommunications Conference, 1997, pp. 746-752, vol. 2.
Ishibashi et al., "A Group Synchronization Mechanism for Stored Media in Multicast Communications," IEEE Information Revolution and Communications, 1997, pp. 692-700, vol. 2.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Mills, David L, "Precision Synchronization of Computer Network Clocks," ACM SIGCOMM Computer Communication Review, 1994, pp. 28-43, vol. 24, No. 2.
Notice of Allowance dated Oct. 13, 2016, issued in connection with U.S. Appl. No. 15/041,101, filed on Feb. 11, 2016, 9 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Presentations at WinHEC 2000, May 2000, 138 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
UPnP; "Universal Plug and Play Device Architecture," Jun. 8, 2000; version 1.0; Microsoft Corporation; pp. 1-54.

\* cited by examiner

| Memory Location | Device #1 | Device #2 | Offset |
|---|---|---|---|
| ABC123 | GC 1002 | GM 1004 | +6 µS |
| DEF456 | GC 1002 | GM 1006 | +2 µS |
| GHI789 | GM 1006 | GM 1004 | +4 µS |

AUDIO SYNCHRONIZATION AMONG PLAYBACK DEVICES USING OFFSET INFORMATION

CROSS REFERENCE TO RELATED APPLICATIONS

This application claims priority under 35 U.S.C. §120 to, and is a continuation of, U.S. non-provisional patent application Ser. No. 15/041,101, filed on Feb. 11, 2016, entitled "Audio Synchronization Among Playback Devices Using Offset Information," which is incorporated herein by reference in its entirety.

U.S. non-provisional patent application Ser. No. 15/041, 101 claims priority under 35 U.S.C. §120 to, and is a continuation of, U.S. non-provisional patent application Ser. No. 14/164,971, filed on Jan. 27, 2014, entitled "Audio Synchronization Among Playback Devices Using Offset Information," issued as U.S. Pat. No. 9,313,591, which is also incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

FIG. 11A shows a playback device receiving offset information;

Figure 1:
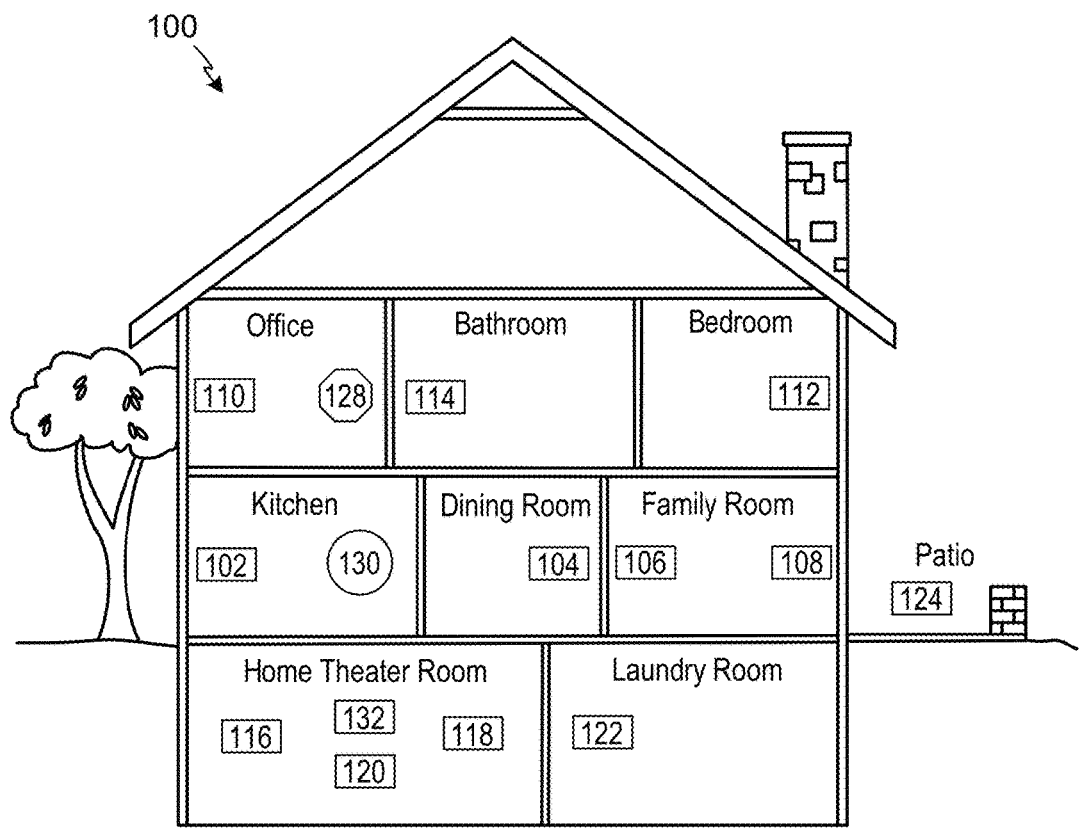
FIG. 1 shows an example configuration in which certain embodiments may be practiced.

In addition, the drawings are for the purpose of illustrating example embodiments, but it should be understood that the inventions are not limited to the arrangements and instrumentality shown in the drawings.

DETAILED DESCRIPTION

I. Overview

Embodiments described herein involve synchronizing media playback among one or more playback devices of a media playback system using offset information. A playback device (i.e., a group member, or "GM") may join a synchrony group upon receipt of a command, where the synchrony group may have a group coordinator ("GC") that is designated to provide timing information for the group. Once the GM has joined the synchrony group, offset information may be used by the GM to establish and maintain audio synchronization among the one or more playback devices in the synchrony group. The offset information may reflect, for example, a difference in rate of change of the clock of a particular GM and the clock of a GC of the synchrony group (e.g., a rate offset). The offset information may further reflect, for example, a difference in the time value of the clock of a particular GM and the clock of a GC of the synchrony group (e.g., an initial offset). The GM uses the offset information to convert timing information provided by the GC of the synchrony group into a time value that can be used to play audio with other members of the synchrony group.

In an implementation, timing information may be provided in audio data packets sent from a GC to GMs of the synchrony group. The GMs may then use the timing information in the audio data packets to determine an appropriate "time-to-play" the audio data such that the audio playback is synchronous across multiple playback devices.

In some cases, a playback device can act as both a GC and a GM for the same synchrony group. In other cases, a playback device can act as a GC for one synchrony group and a GM for another synchrony group. In other cases, a playback device can act only as a GC of a synchrony group and not a GM. In other cases, a playback device can act only as a GM of a synchrony group and not a GC. In some embodiments the playback device can dynamically take on, or relinquish, the role of a GC and/or GM.

In some cases, timing information provided by the GC may be relative to the GC's local clock which may be different from the GM's local clock. The difference between the clock of a GM and the clock of the GC may be characterized, for example, by an initial offset and a rate offset. Therefore, in an implementation, the offset information may include a rate offset. In another implementation, the offset information may indicate both an initial offset and a rate offset.

In an implementation, a playback device may retrieve offset information from memory storage. This may be done using a look-up table to determine the memory location of the offset information.

In another implementation, offset information may not be available in memory storage and, as a result, the offset information may be computed by the GM. For example, the offset information may be computed using other types of offset information stored in memory storage, such as offsets between other devices in the media playback system. For example, the offset information may be computed using stored offsets (1) between a clock of a first playback device and a clock of a second playback device, and (2) between the clock of the second playback device and the clock of the GC. Other examples may also be possible.

In some cases, an iterative process may be used by a GM to reduce rate error between its clock and a clock of the GC. This may be done, for example, by the GM (1) estimating the GC clock after a time interval has passed, (2) determining an error between the estimated GC clock value and a received GC clock value, and (3) adjusting the GM's local clock to account for this error. This process may be repeated in an iterative fashion until the rate error is within a predetermined limit. The adjustment required to reduce the error to within a predetermined limit may also be described as the offset needed to bring the error within a bound. The rate offset may be represented, for example, as a measure of time (e.g., usec), number of samples, number of samples per frame, number of samples per time, or a value used to adjust the rate of the clock.

As indicated above, the present application involves synchronization of audio playback of two or more playback devices using offset information. In one aspect, a method is provided. The method involves causing a first playback device to join a synchrony group upon a command, the synchrony group having a group coordinator that provides timing information for the synchrony group. The method also involves retrieving from a memory storage, by the first playback device, data representing an offset between a clock of the first playback device and a clock of the group coordinator, where the data representing the offset was placed in the memory storage prior to the command. The method further involves using, by the first playback device, the data representing the offset and the timing information to play audio with the synchrony group.

In another aspect, a non-transitory computer readable memory is provided. The non-transitory computer readable memory has stored therein instructions executable by a processor to cause the processor to perform functions. The functions include causing a first playback device to join a synchrony group upon a command, the synchrony group having a group coordinator that provides timing information for the synchrony group. The functions also include retrieving from a memory storage, by the first playback device, data representing an offset between a clock of the first playback device and a clock of the group coordinator, where the data representing the offset was placed in the memory storage prior to the command. The functions further include using, by the first playback device, the data representing the offset and the timing information to play audio with the synchrony group.

In yet another aspect, a system is provided. The system includes a first playback device, a second playback device, and a group coordinator. The first playback device has stored thereon instructions executable by a processor to cause the device to perform functions. The functions include causing a first playback device to join a synchrony group upon a command, the synchrony group having a group coordinator that provides timing information for the synchrony group. The functions also include retrieving from a memory storage, by the first playback device, data representing an offset between a clock of the first playback device and a clock of the group coordinator, where the data representing the offset was placed in the memory storage prior to the command. The functions further include using, by the first playback device, the data representing the offset and the timing information to play audio with the synchrony group.

In yet another aspect, another method is provided. The method involves causing a first playback device to join a synchrony group upon a command, the synchrony group having a group coordinator that provides timing information for the synchrony group. The method also involves determining, by the first playback device, that data representing an offset between a clock of the first playback device and a clock of the group coordinator is not available in a memory storage. The method additionally involves computing, by the first playback device, the offset between the clock of the first playback device and the clock of the group coordinator. The method further involves using, by the first playback device, the offset and the timing information to play audio with the synchrony group.

In yet another aspect, another non-transitory computer readable memory is provided. The non-transitory computer readable memory has stored therein instructions executable by a processor to cause the processor to perform functions. The functions include causing a first playback device to join a synchrony group upon a command, the synchrony group having a group coordinator that provides timing information for the synchrony group. The functions also include determining, by the first playback device, that data representing an offset between a clock of the first playback device and a clock of the group coordinator is not available in a memory storage. The functions additionally include computing, by the first playback device, the offset between the clock of the first playback device and the clock of the group coordinator. The functions further include using, by the first playback device, the offset and the timing information to play audio with the synchrony group.

In yet another aspect, another system is provided. The system includes a first playback device, a second playback device, and a group coordinator. The first playback device has stored thereon instructions executable by a processor to cause the device to perform functions. The functions include causing a first playback device to join a synchrony group upon a command, the synchrony group having a group coordinator that provides timing information for the synchrony group. The functions also include determining, by the first playback device, that data representing an offset between a clock of the first playback device and a clock of the group coordinator is not available in a memory storage. The functions additionally include computing, by the first playback device, the offset between the clock of the first playback device and the clock of the group coordinator. The functions further include using, by the first playback device, the offset and the timing information to play audio with the synchrony group.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media playback system configuration 100 in which one or more embodiments disclosed herein can be practiced or implemented.

By way of illustration, the media playback system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. Zone players 102-124, also referred to herein as playback devices, multimedia units, speakers, players, and so on, provide audio, video, and/or audiovisual output. A controller 130 (e.g., shown in the kitchen for purposes of this illustration) provides control to the media playback system configuration 100. Controller 130 may be fixed to a zone, or alternatively, mobile such that it can be moved about the zones. The media playback system configuration 100 may also include more than one controller 130, and additional controllers may be added to the system over time.

The media playback system configuration 100 illustrates an example whole house media playback system, though it is understood that the technology described herein is not limited to, among other things, its particular place of application or to an expansive system like a whole house media playback system 100 of FIG. 1.

a. Example Zone Players

Figure 2A:
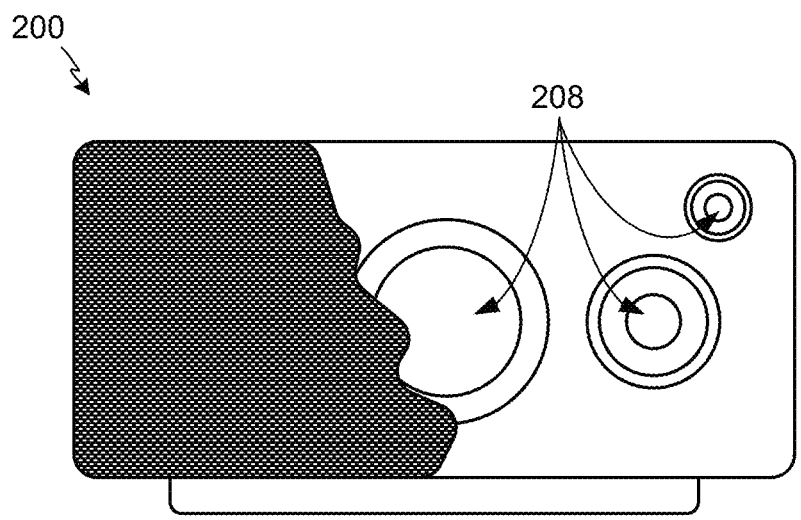
FIG. 2A shows an illustration of an example zone player having a built-in amplifier and transducers.
Figure 2B:
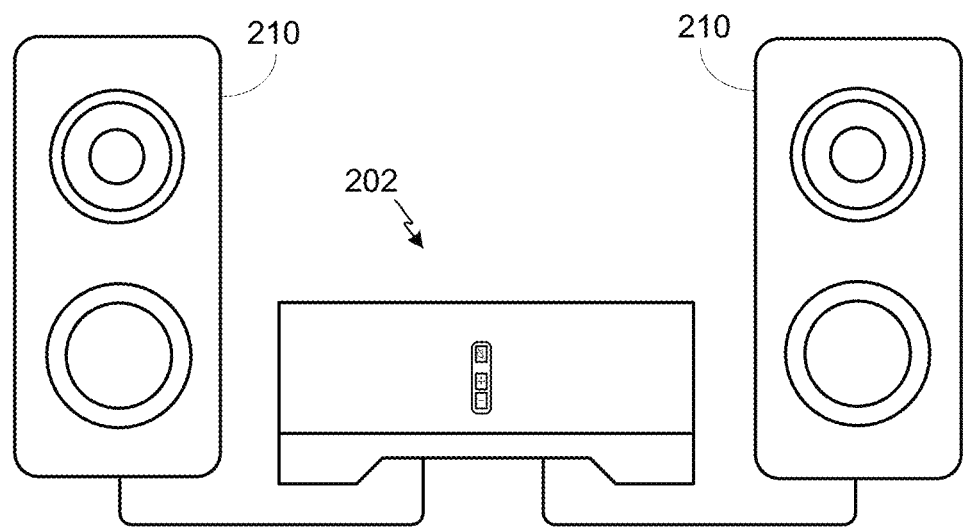
FIG. 2B shows an illustration of an example zone player having a built-in amplifier and connected to external speakers.
Figure 2C:
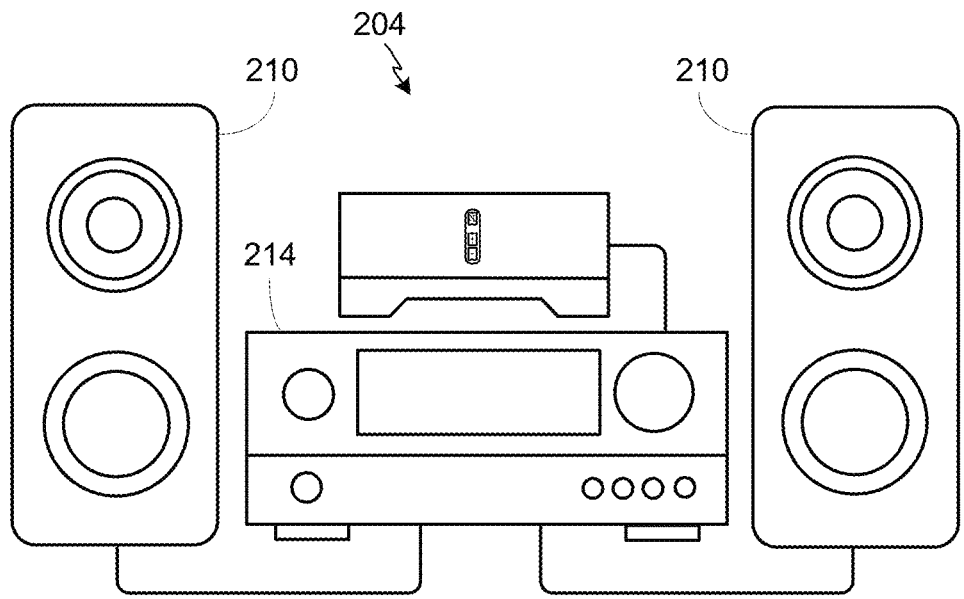
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates a zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the media content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAY:1," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
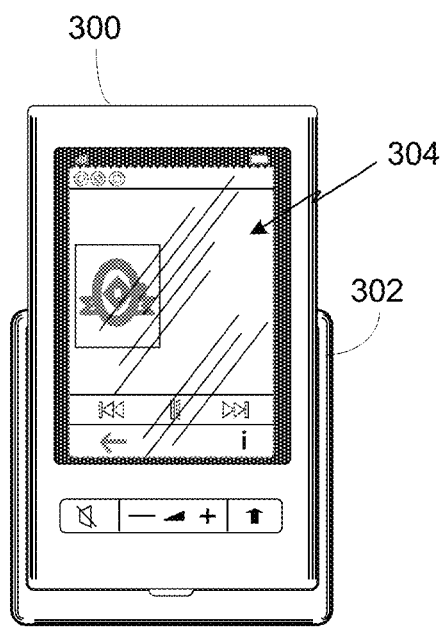
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Zone players 102-124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
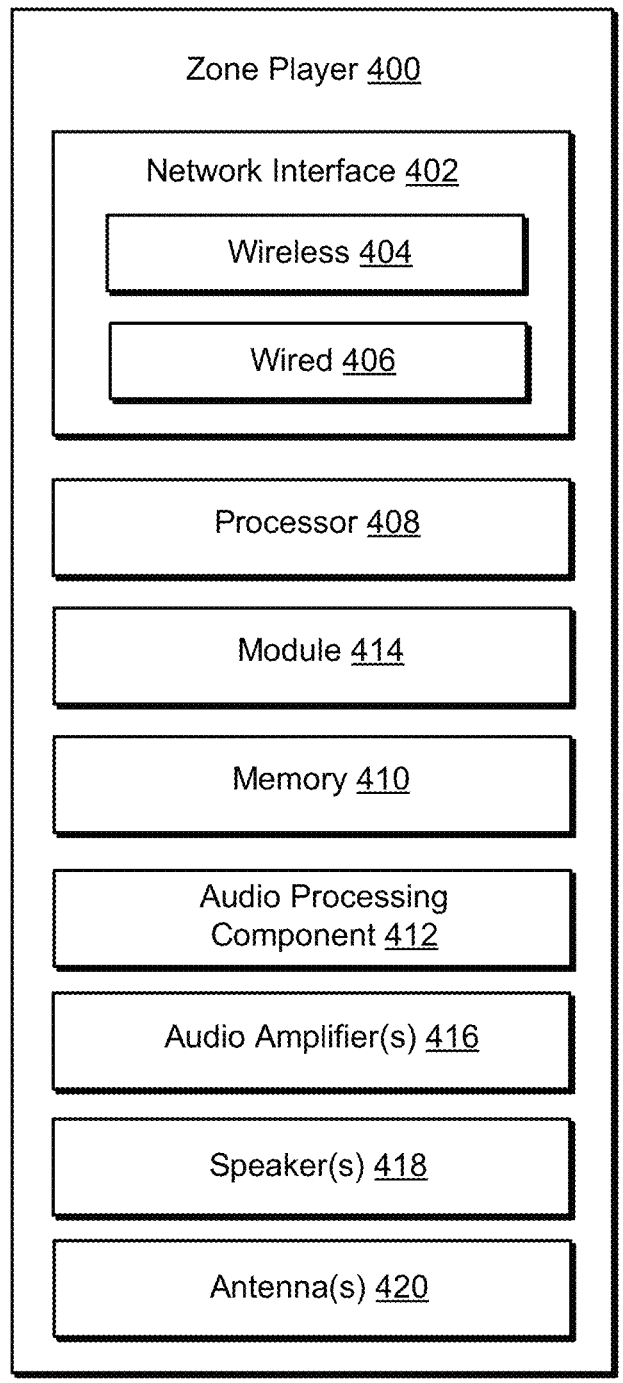
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
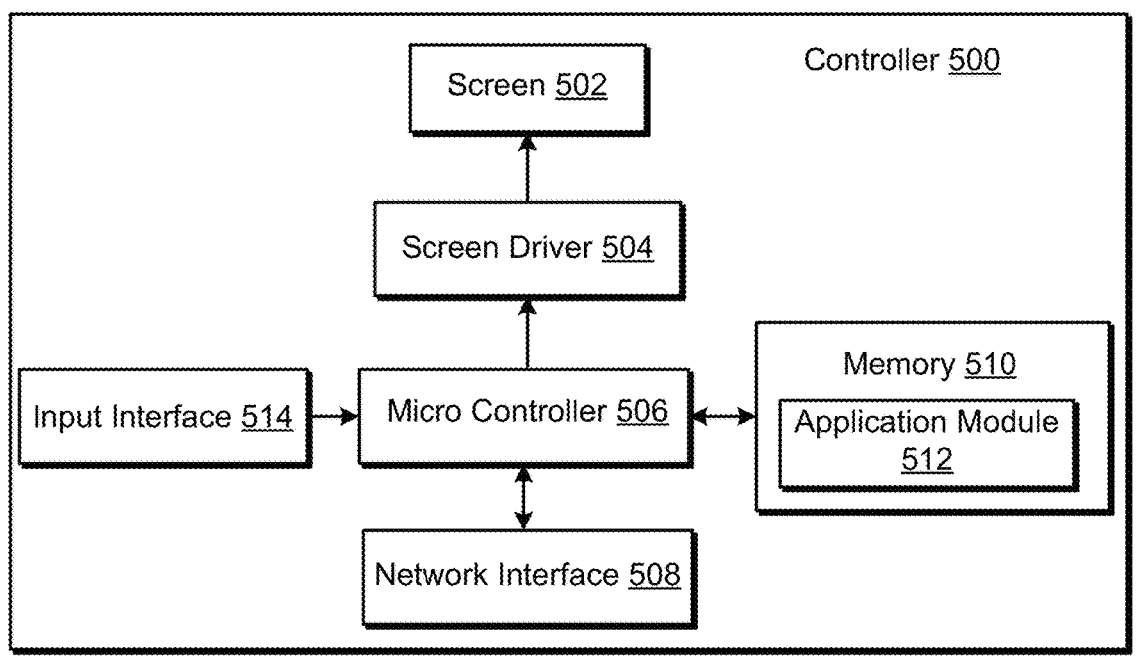
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group to facilitate synchronized playback amongst the zone players in the zone group. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired and/or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smart phone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone"

soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
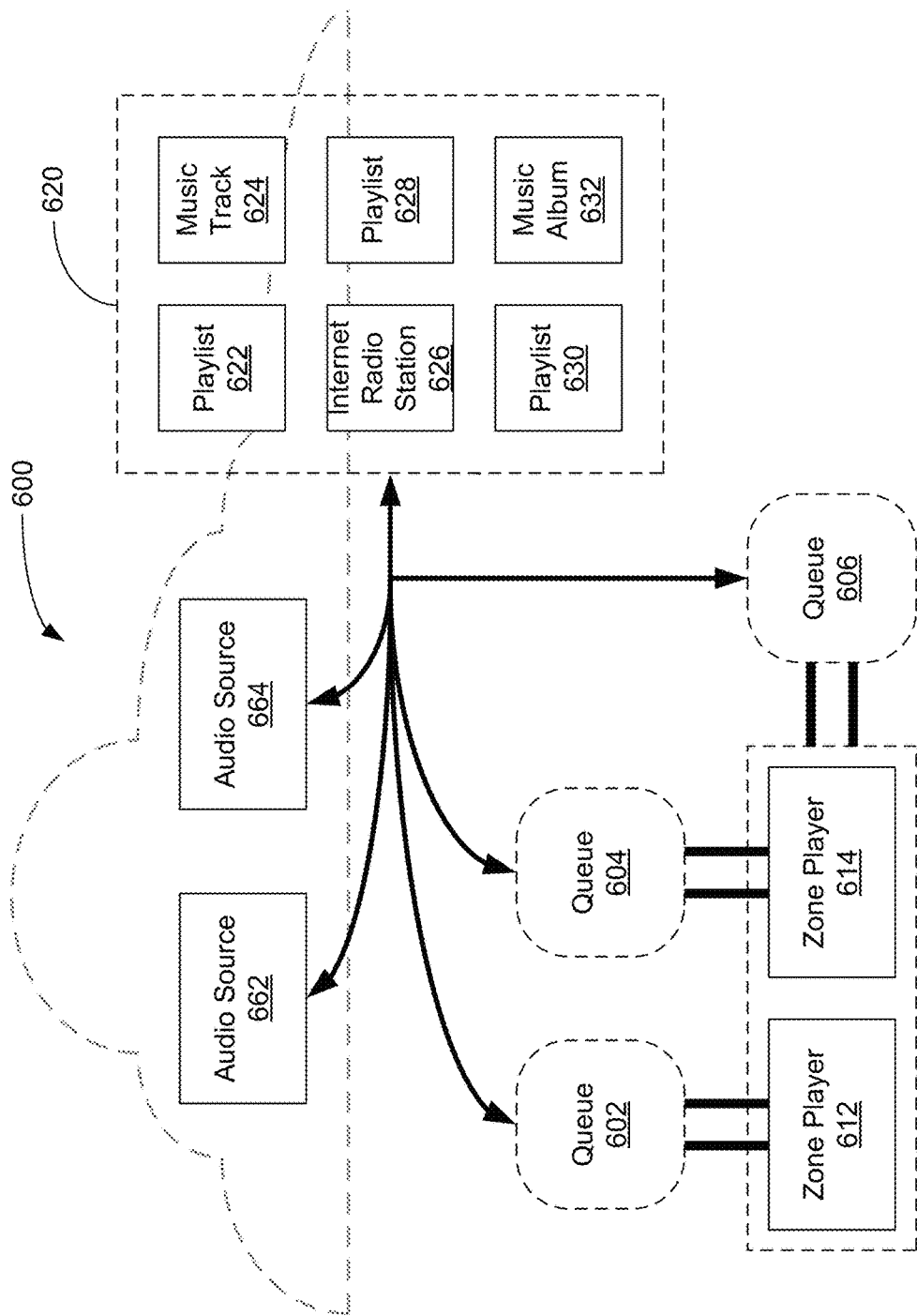
FIG. 6 shows an example playback queue configuration for a network media playback system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
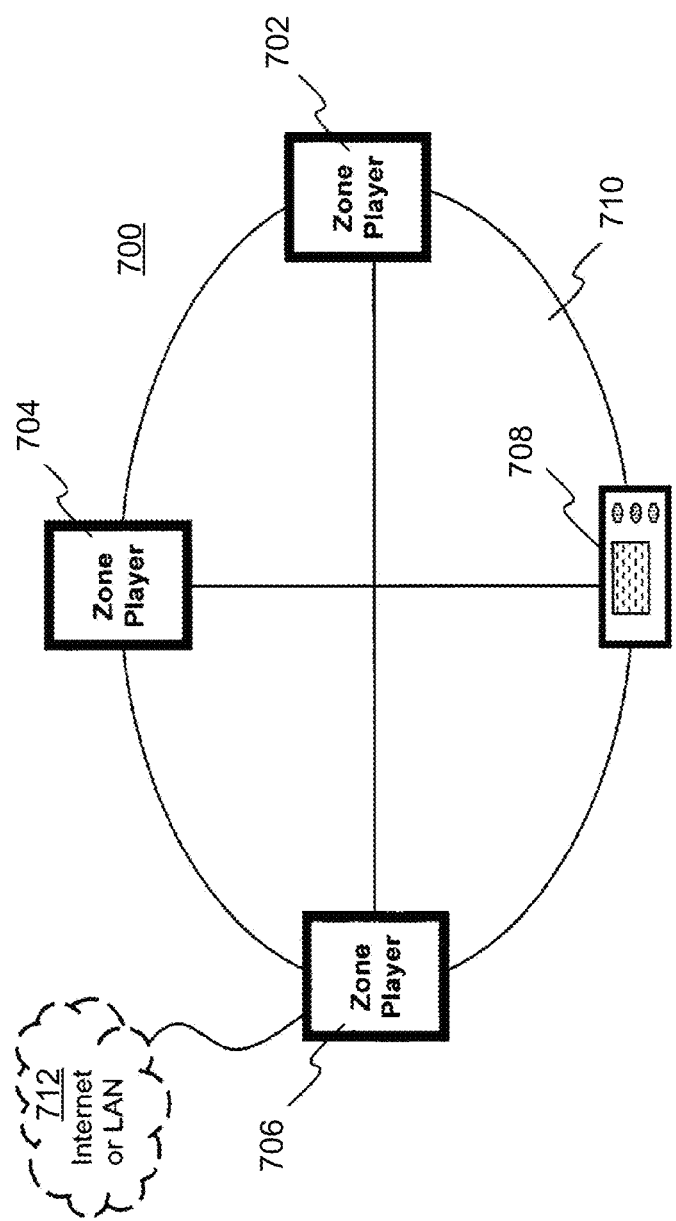
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
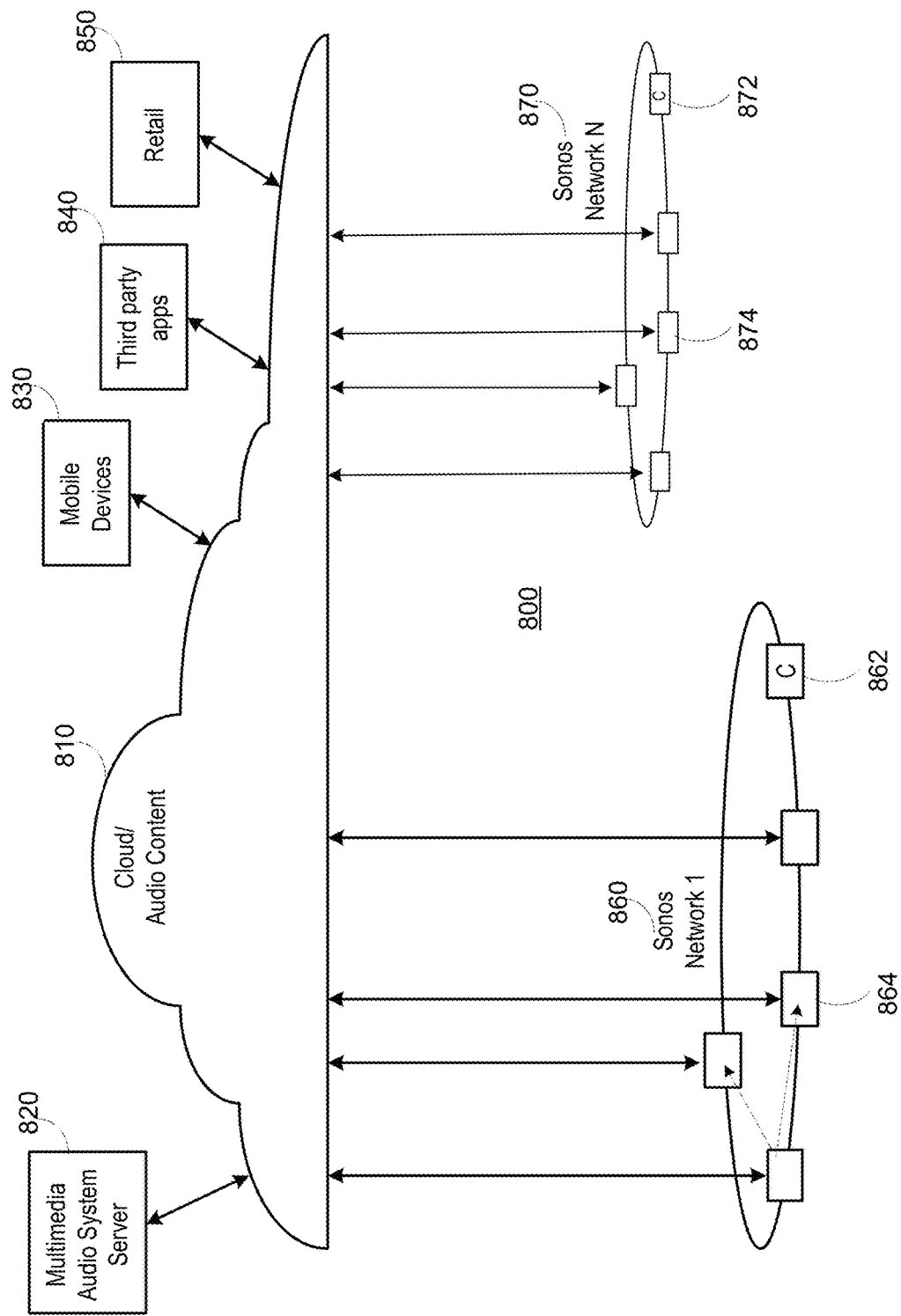
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™) a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Audio Synchronization Among Playback Devices Using Offset Information Stored in Memory In FIG. 9, a flowchart is shown illustrating a method 900, according to an example embodiment. Method 900 may be implemented to provide synchronized audio playback among multiple playback devices in a synchrony group using timing offset information that may be retrieved from a memory storage. Method 900 presents an embodiment of a method that could be used in the environments 100, 600, 700, and 800 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-906. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Figure 9:
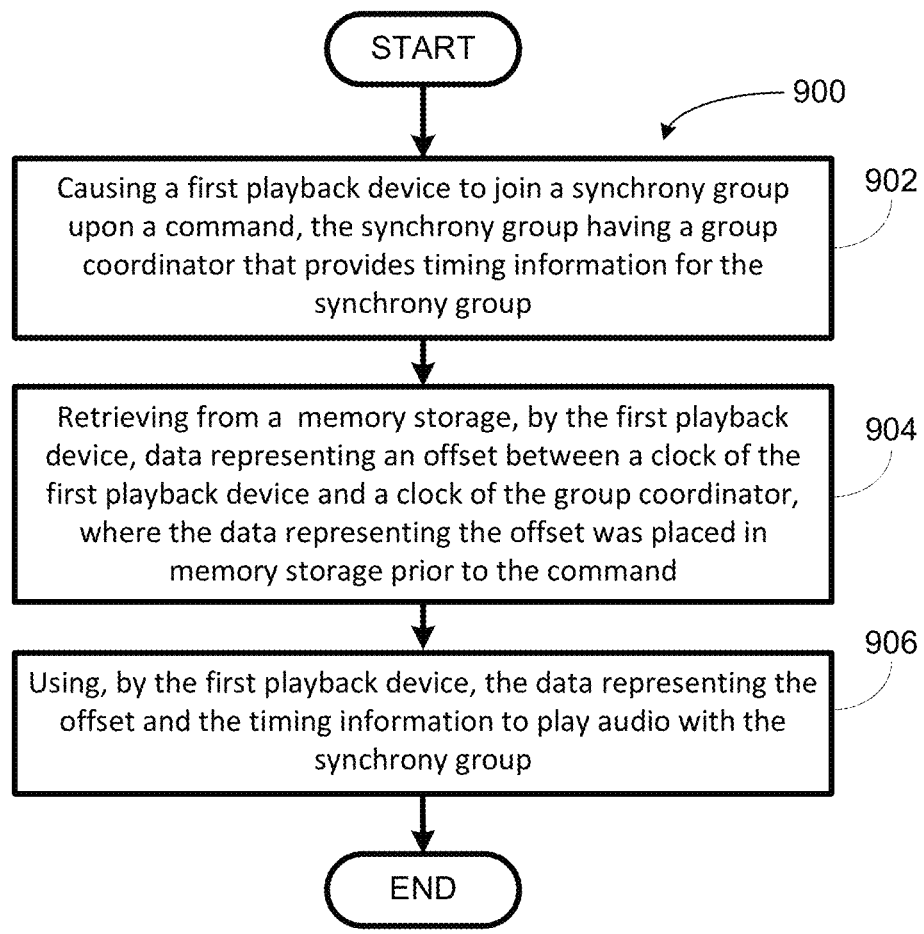
FIG. 9 shows an example flow diagram for synchronization of audio playback in a synchrony group using offset information.
Figure 10A:
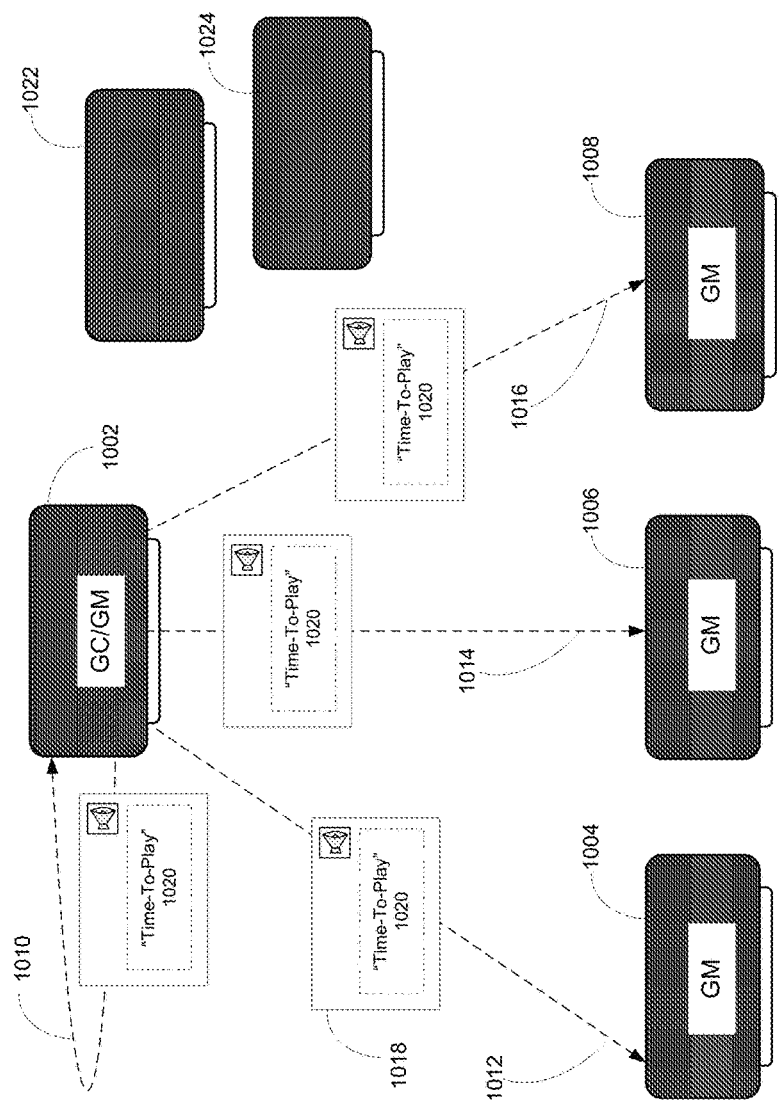
FIG. 10A shows an example synchrony group within a household at a first time.

To help explain FIG. 9, reference is made below to FIG. 10A, and therefore a brief description of FIG. 10A is now provided. FIG. 10A shows an example household configuration consisting of playback devices 1002, 1004, 1006, 1008, 1022, and 1024. As shown, the example household configuration includes an example synchrony group including a group coordinator ("GC") device 1002 and three group member ("GM") devices 1004, 1006, and 1008. In this example, the GC device and the three GM devices are all audio playback devices, and each device includes an independent clock that is used to playback audio. Further, in this example, the GC device is also a GM device of the synchrony group. In another example (not shown) the GC device is not a GM device of the synchrony group. In yet another example (not shown) the GC device is not a playback device.

In a synchrony group such as that shown in FIG. 10A, audio may be synchronously playing on each of the playback devices within the synchrony group. In one implementation, a single device that is designated as the GC 1002 may receive an audio stream and distribute that audio stream to other devices in the synchrony group. For instance, the GC 1002 may be responsible for receiving an audio stream over a network connection (e.g., Ethernet, wireless), setting up proper resources for audio playback, determining a compression or coding format, and/or handling metadata (i.e., data that provides information about other data), among other possibilities.

An audio stream (or audio data) that is received by the GC 1002 is provided to the GMs of the synchrony group. In some cases, the GC 1002 may process the audio stream before providing the audio stream to the GMs of the synchrony group. In a case where GC 1002 is also a GM (i.e., GC 1002 synchronously plays back audio with the other GMs of the synchrony group), the audio stream may also be provided by the GC 1002 to itself. In other words, the GC 1002 may provide the audio data to the playback devices in the synchrony group, including itself, as shown by arrows 1010, 1012, 1014, and 1016. Further, once audio data is provided by the GC 1002, each playback device that is a GM may process the audio data for purposes of playing back the audio in synchronization with the other playback devices in the synchrony group.

It should be understood that the household configuration shown in FIG. 10A, including the example synchrony group, is shown at a particular example point in time. As will be discussed further below in connection with FIG. 10B, the particular synchrony group configuration of the household may be different at some other point in time. For instance, at some future point in time, playback devices within the household may be added to and/or removed from the example synchrony group.

Note that any playback device that plays audio as part of the synchrony group (i.e., any of devices 1002, 1004, 1006, and 1008) may also be referred to as a GM. As such, the GC 1002 may also be a GM of the group shown in FIG. 10A. Further, note that the dotted arrows in FIGS. 10A and 10B (i.e., 1010, 1012, 1014, 1016, and 1026) serve as a visual representation for the set of playback devices that form the synchrony group. Yet further, note that each playback device of a synchrony group is labeled as a GM, GC, or GC/GM for further visual clarification.

However, in another case, a given playback device may serve as a GC and coordinate a given synchrony group, but that given playback device may not play audio as part of the synchrony group. In such a case, the GC of the synchrony group is not a GM of the synchrony group. Thus, with respect to FIG. 10A, the GC 1002 may coordinate the example synchrony group shown in FIG. 10A, while not being a GM (i.e., while not playing audio with) of that particular group (note that this example scenario is not shown in FIG. 10A).

In yet another case, a given playback device may serve as a GC and coordinate a first synchrony group, and at the same time the playback device may be a GM of a second synchrony group (i.e., the playback device may play audio as part of the second synchrony group). Thus, with respect to FIG. 10A, the GC 1002 may coordinate the example synchrony group shown in FIG. 10A, while being a GM of a different group (note that this example scenario is not shown in FIG. 10A).

Other examples and arrangements of a given playback device serving as both a GC and GM may exist.

a. Providing Timing Information to a Synchrony Group

At block 902, method 900 involves causing a first playback device to join a synchrony group upon a command, the synchrony group having a group coordinator that provides timing information for the synchrony group.

An example command is noted above in association with FIG. 5. In particular, as discussed above in association with FIG. 5, a user via the controller 500 can dynamically group zone players (i.e., playback devices) into a zone group (i.e., synchrony group) by activating a "Link Zones" or "Add Zone" soft button, or de-group a zone player from a zone group by activating an "Unlink Zones" or "Drop Zone" button. Other such suitable commands for causing a playback device in a household to join a synchrony group may exist. For example, pressing combinations of buttons on multiple playback devices may form a synchrony group. Other examples may also be possible.

Figure 10B:
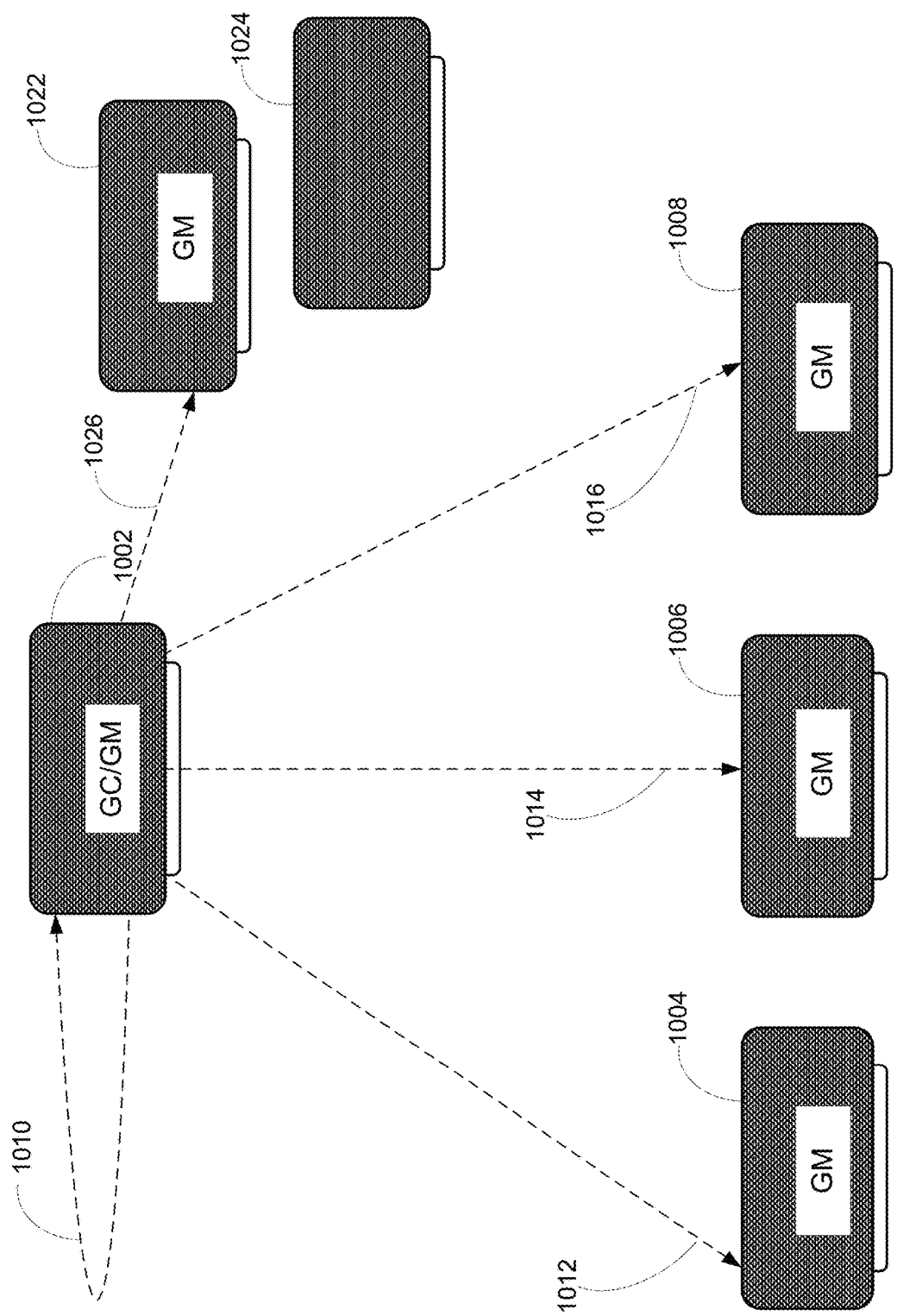
FIG. 10B shows an example playback device joining the example synchrony group at a second time.

Once the command is received to add a playback device to a synchrony group, in accordance with block 902, the playback device may join the synchrony group. To illustrate, consider FIG. 10B showing playback device 1022 joining the example synchrony group shown in FIG. 10A via link 1026. It may be understood that FIG. 10B generally illustrates the same household as that shown in FIG. 10A; however, FIG. 10B may represent a point in time later than the point in time represented by FIG. 10A. Upon receiving a command in connection with Block 902 such as that described above, the playback device 1022 may join the existing synchrony group that includes other playback devices (i.e., 1002-1008) resulting in a synchrony group that includes playback devices 1002, 1004, 1006, 1008, and 1022. In accordance with other aspects of method 900, playback devices that join such a synchrony group may ultimately playback audio data in synchrony with the other playback devices within the synchrony group. Other examples and/or aspects of joining a synchrony group may exist.

As also noted, block 902 may involve a GC that provides timing information for the synchrony group. In an implementation, the GC may provide such timing information together with the distribution of audio within the synchrony group. For example, FIG. 10A shows the GC 1002 sending an audio data packet 1018 to the GMs (as shown by arrows 1010, 1012, 1014, and 1016), where the packet 1018 includes a "time-to-play" 1020. Such a "time-to-play" 1020 is one example of timing information. Note that in this example the GC 1002 sends the packet 1018 to all GMs in the synchrony group. Other examples may exist.

As discussed above and shown in FIG. 10A, the GC 1002 transmits audio data packets to the GMs 1004, 1006, 1008 (i.e., playback devices) in the synchrony group. If GC 1002 is also a GM of the synchrony group, then GC 1002 effectively transmits an audio data packet to itself, however, the audio data packet need not actually be transmitted externally to the device 1002, but may be transferred internally within the device 1002. For purposes of example and explanation, the process of sending the data from the GC 1002 to GMs 1004, 1006, 1008 may be termed "TX". On the other hand, the process of receiving the data by GMs 1004, 1006, 1008 may be termed "RX". The terms "TX" and "RX" may also be associated with transmit and receive buffers. These buffers may be memory spaces allocated to store data packets in order to avoid data being dropped when resources are unavailable. For example, network congestion may prohibit immediate transmission of a data packet, and that data packet may be stored in a TX buffer while awaiting transmission. Other examples will be evident to those skilled in the art.

For instance, the audio data packet 1018 as shown in FIG. 10A, may be stamped with the "time-to play" 1020, put into a TX-buffer, and subsequently transmitted to the GMs 1004, 1006, and 1008. The "time-to-play" 1020 may be determined by the GC 1002, and may consider an estimate of the time required to distribute the data to the GMs 1004, 1006, and 1008, as well as the time required for the GMs 1004, 1006, and 1008 to process the data for audio playback. The value of the "time-to-play" 1020 may be with reference to the local clock of the GC 1002. In one example, providing timing information may involve sending the timing information to a GM that is not the GC 1002 of the synchrony group. In this example, the GM may be running its own independent clock and may not have direct access to the clock in the GC 1002 that stamped the "time-to-play" 1020. As such, synchronization of audio playback (in accordance with block 906 of the method) may involve additional steps, some aspects of which will be discussed further below. In another example, the timing information may be provided by a GC to itself (i.e., in a situation where the GC is also a GM of the synchrony group) as demonstrated by arrow 1010. In this example, synchronization of audio playback (in accordance with block 906 of the method) with the "time-to-play" may be relatively straightforward, because the playback device (i.e., the GC 1002) may have access to the same clock which was used to stamp the packet 1018 with the "time-to-play" 1020. Other examples may also be possible.

Note that when audio playback is just beginning, the GC may queue up the audio to play at a time when a device's internal clock reaches the "time-to-play" 1020 stamped on the packet 1018. On the other hand, if the audio playback is already in progress, samples of the audio may be put directly into the playback buffer. Further, note that in some cases the "time-to-play" may be specific to a particular packet such that the audio content associated with the packet is played at the "time-to-play".

Yet further, note that a playback device clock may not be set to a specific time of the day. Rather, the clocks in each device may keep time in a unit such as seconds, milliseconds, or microseconds, among other possibilities. And the time may be kept in the selected unit starting at the moment a device is first booted up. Moreover, the timing of each device may differ from "physical" seconds by a rate/frequency error of each clock. Therefore, clocks of different playback devices may return different times even when checked simultaneously.

b. Retrieving Offset Information from a Memory Storage

At block 904, method 900 involves retrieving from a memory storage, by the first playback device, data representing an offset between a clock of the first playback device and a clock of the group coordinator, where the data representing the offset was placed in a memory storage prior to the command.

To illustrate, consider FIG. 11A showing the first playback device 1004 receiving offset information 1104 (i.e., the data representing an offset) from a memory storage 1102. Memory storage 1102 may be memory 410 as discussed above in association with FIG. 4. Note that although memory storage 1102 is shown separate from playback device 1004, it should be understood that a memory storage may be internal or external to playback device 1004.

The memory storage 1102 may be located locally on a playback device. In one case, each GM may have its own local memory storage. In another case, some GMs may not have local memory storage. If a given GM does not have local memory storage, then the GM may access memory storage that is local to another device on the network (e.g., a given GM may retrieve information from the memory storage of another playback device such as another GM). Thus, if a memory storage is located on only some of the GMs, for example, then the memory storage on any of these GMs may be accessed by the set of GMs that do not have a memory storage. Further, GMs that have a memory storage may also be able to access each other's memory storage. In another case, the memory storage may be located on a remote server (e.g., any suitable remote network location) or any other network reachable device.

Note that a playback device (such as a playback device that is part of the synchrony group or any playback device in a household) may store, in a memory storage, offset information representing the offsets between its own clock and clocks of other playback devices. Also, a playback device may also store offset information representing the offsets between clocks of other playback devices (i.e., offset unrelated to the clock of the playback device itself). Further, note that exchange of such offset information between playback devices may occur when any playback device starts up, joins the household, and/or joins a synchrony group, among other possibilities. Yet further, note that the offset information may be, for example, replicated and/or distributed among the playback devices.

The offset information 1104, as shown in FIG. 11A, may represent the offset between the clock of the first playback device 1004 and the clock of the GC 1002. In one case, the offset information 1104 may be offset information that was determined during a previous grouping between the device 1004 and the GC 1002. In this case, the grouping may be the most recent grouping or may be a grouping that has occurred prior to the most recent grouping.

In another case, the offset information 1104 may be an average of offset information obtained in two or more previous groupings between the device 1004 and the GC 1002. For instance, the grouping between the device 1004 and the GC 1002 may have previously determined offsets of 2 µS, 3 µS, and 4 µS. Consequently, the current offset information 1104 may include an offset that is an average of all previously determined offsets (i.e., 3 µS). Note that µS stands for microseconds.

Figure 13:
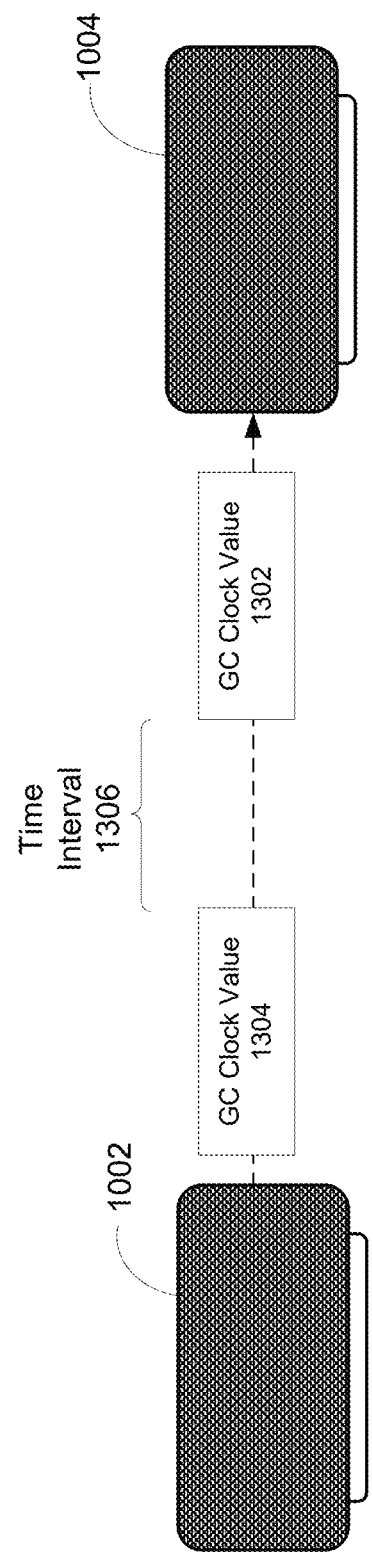
FIG. 13 shows a process to reduce an offset error.

Note that the offset information 1104 may, additionally or alternatively, include a clock rate offset and/or a predetermined offset limit as will be further discussed below in association with FIG. 13. Also note that other cases may also be possible.

Figure 11B:
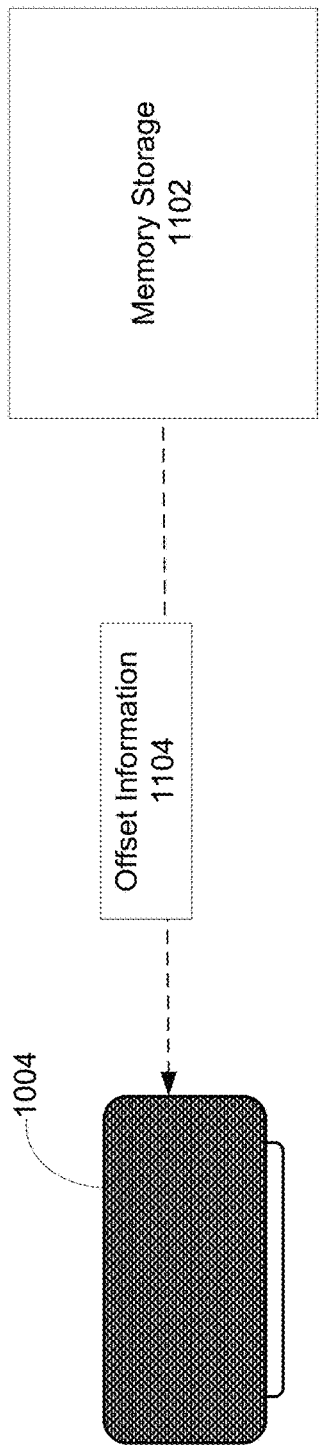
FIG. 11B shows an example look-up table.

FIG. 11B shows an example look-up table 1106 that may be used to determine a memory location of the data representing the offset between a clock of the first playback device 1004 and the clock of the GC 1002. The look-up table 1106 may be used to retrieve the offset information 1104 from the memory storage 1102. For instance, the look-up table 1106 may indicate a memory location of ABC123 at which is stored the offset between the GC 1002 and the first playback device 1004 (shown as GM 1004).

Note that the look-up table 1106 as presented in FIG. 11B is provided for illustration purposes only. The look-up table 1106 may take on any form and may include additional information such as a date an offset was determined, among other possibilities. Further, note that the look-up table 1106 may also include a memory location of data representing an offset between the clock of the first playback device 1004 and the clock of another GC (not shown), among other possibilities.

As will be further discussed below in association with FIG. 12, whenever a new device is added to the synchrony group, offset information 1104 may be calculated and then stored in a memory storage 1102. As noted above, the memory storage 1102 may be located on any of the playback devices such as the first playback device 1004 or may be located on another device that is not the playback device (e.g., a server), among other possibilities. Further, the offset information 1104 may be recalculated whenever any of the playback devices are rebooted.

c. Playing Audio with the Synchrony Group

At block 906, method 900 involves using, by the first playback device, the data representing the offset and the timing information to play audio with the synchrony group. In accordance with block 906, the offset information and the timing information may be used to maintain proper synchronization of audio playback among the playback devices in the synchrony group. For example, the first playback device 1004 may continuously (or periodically) receive audio data packets 1018 stamped with timing information (i.e., the "time-to-play" 1020) that is based on the clock at the GC 1002. The device 1004 may then use the retrieved offset information 1104 to convert the timing information (i.e., "time-to-play" 1020) stamped on the audio data packet 1018 by the GC 1002 into a time value that, when audio is played according to the playback device's local clock, the audio is played in synchrony with other playback devices in the synchrony group. For example, the playback device 1004 may add the time value indicated by the offset information (e.g., +6 µS) to the "time-to-play," (e.g., 1 µS) to arrive at a time value of 7 µS at which the playback device 1004 will play the audio according to the playback device's 1004 local clock.

IX. Synchronization of Audio Playback Using Computed Offset Information

Figure 12:
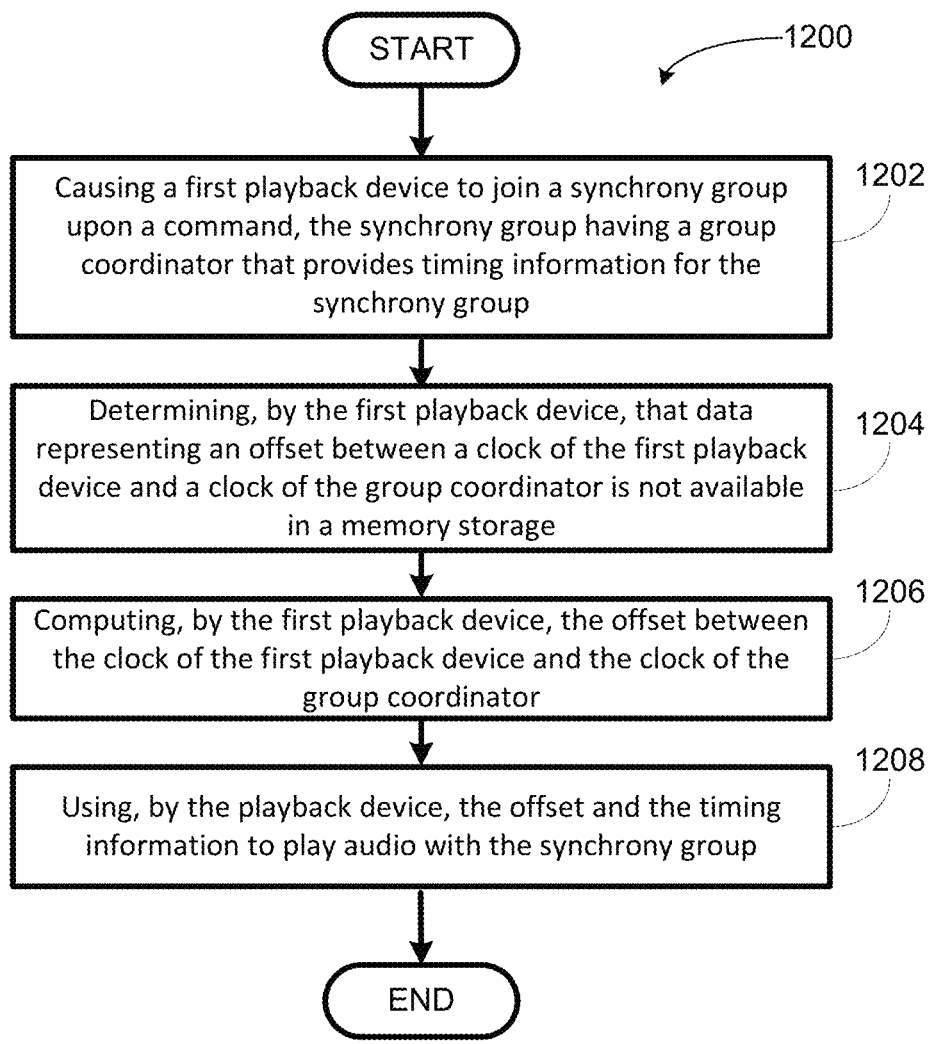
FIG. 12 shows an example flow diagram for synchronization of audio playback in a synchrony group using computed offset information.

FIG. 12 is a flowchart illustrating a method 1200, according to an example embodiment. Method 1200 may be implemented to synchronize audio playback in a synchrony group using computed offset information. Method 1200 presents an embodiment of a method that could be used in the environments 100, 600, 700, and 800 with the systems 200, 202, 204, 300, 400, and 500 for example, in communication with one or more devices, such as those illustrated in FIGS. 2-5. Method 1200 may include one or more operations, functions, or actions as illustrated by one or more of blocks 1202-1208. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

a. Providing Timing Information to a Synchrony Group

At block 1202, method 1200 involves causing a first playback device to join a synchrony group upon a command, the synchrony group having a group coordinator (GC) that provides timing information for the synchrony group. Block 1202 may be understood similarly to block 902 of FIG. 9 as discussed above.

b. Determining that Offset is Not Available in a Memory Storage

At block 1204, method 1200 involves determining that data representing an offset between a clock of the first playback device and a clock of the group coordinator is not available in a memory storage. For instance, in some cases retrieving offset information from a memory storage may not be possible because such offset information may not have been previously stored in the memory storage, among other possibilities.

c. Computing Offset Information

At block 1206, method 1200 involves computing the offset between the clock of the first playback device and the clock of the group coordinator.

i. Computing Offset Information Using Existing Information

In one case, the offset may be computed using offset information (1) between the clock of the first playback device and the clock of the second playback device, and (2) between the clock of the second playback device and the clock of the GC. Note that the first playback device is a GM in the synchrony group, but the second playback device does not necessarily need to be a GM in the synchrony group. In particular, the offset information for (1) and (2) may be retrieved from a memory storage and may be used to compute the offset between the clock of the first playback device and the clock of the group coordinator.

To illustrate, consider again FIG. 11B showing the look-up table 1106. The look-up table 1106 may be used to determine the memory location of the data representing the offset for (1) and (2) as described above. For instance, the look-up table 1106 as shown in FIG. 11B indicates that the offset between the clocks of GC 1002 and GM 1006 (i.e., second playback device 1006) is +2 μS. In other words, the clock of the second playback device 1006 is 2 μS ahead of the clock for the GC 1002. Further, table 1106 shows that the clock of the first playback device 1004 is 4 μS ahead of the clock for the second playback device 1006. Consequently, it can be determined that the clock of the first playback device 1004 is 6 μS ahead of the clock for the GC 1002.

Note that the values used herein are used for illustration purposes only. Also note that any other set of offset information may also be used to determine the offset between the clock of the first playback device 1004 and the clock of the GC 1002. For example, the following offset information may also be used: (1) an offset between a clock of first playback device 1004 and a clock of second playback device 1006, (2) an offset between a clock of the second playback device 1006 and a clock of a third playback device 1008, and (3) an offset between a clock of the third playback device 1008 and a clock of GC 1002. Additional examples may also be possible.

Note that all computed information (i.e., data representing the offset between the clock of the first playback device 1004 and the clock of the group coordinator 1002) described herein may be stored in a memory storage 1102 after the computation is complete. Also, as noted above, the memory storage 1102 may be located on any of the playback devices such as the first playback device 1004 or may be located on another device that is not the playback device (e.g., a server), among other possibilities. Further, as discussed above in association with block 904, note that the computed information may be replicated and/or distributed among the playback devices.

ii. Computing Offset Information Using SNTP Polling

In some cases, insufficient information may be available in a memory storage 1102 to compute the offset information. In this case, the offset information may be computed using a communication protocol such as the Simple Network Time Protocol (SNTP). In one implementation, SNTP may be used to compute an initial offset, and the offset is refined over time using an additional algorithm.

An example SNTP polling process may involve an exchange of data packets (which may contain time stamps) between playback devices. Such a process may be used to compute an initial offset between the clock of the first playback device 1004, or any other GM, and the clock of the GC 1002. Note that the data packets may be sent between the devices periodically. Further, note that the computed offset may contain some amount of error. Nonetheless, the error between the clocks may be reduced over time as described below.

An iterative process may be used by each GM to reduce the error in offset between its local clock the clock for the GC 1002. To illustrate, consider FIG. 13 depicting aspects of an example iterative process to reduce the error.

A GM, such as the first playback device 1004, may estimate the clock value of the GC 1002. The estimation may be done using the computed offset as described above or may be done using any other process. Subsequently, an actual GC clock value 1302 may be received by the first playback device 1004. The actual GC clock value 1302 and the expected GC clock value (not shown) may then be used to determine a difference between the values. The local clock on the device 1004 may then be adjusted to account for the determined difference.

In one example, the clocks of different playback devices may be synchronous (i.e., the clocks are ticking at the same rate). In this example, any difference between the values of such clocks may be referred to as a linear offset, and adjusting the clock value to account for a determined difference may involve accounting only for this linear offset. In another example, the clocks of different playback devices may be asynchronous (i.e., the clocks are ticking at different rates). In this example, the asynchronous difference in the clocks may be referred to as a clock rate offset, and adjusting the clock value to account for a determined difference may further involve adjusting the clock rate offset between the playback devices.

In some cases, this process may be repeated after a time interval 1306 has passed. The process may be repeated using, for example, a GC clock value 1304 sent some time after the first GC clock value 1302 is sent. This process may be repeated in an iterative fashion until the error is within a predetermined offset limit. The predetermined offset limit may also be described as the offset needed to bring the error within a bound. As discussed above in association with FIGS. 11A and 11B, offset information 1104 retrieved from a memory storage 1102 may include a clock rate offset and/or a predetermined offset limit. may be referred to as the Delta offset (also referred to as the error frequency between two independent clocks, frequency error offset, or rate error offset). Once the value of the Delta offset is known it may remain relatively stable over time.

Note that the calculated offset may differ from one GM to another. Also, as noted above, the calculated offset may be stored in a memory storage 1102. Further, the offset may be distributed throughout the playback system such that other playback devices may have access to the information.

Yet further, note that SNTP polling represents one example implementation for computing offset information and is not meant to be all encompassing. One of ordinary skill in the art will appreciate other example implementations for computing offset information.

d. Using the Information to Play Audio with the Synchrony Group

At block 1208, similarly to block 906 of method 900, method 1200 involves using, by the first playback device, the offset and the timing information to play audio with the synchrony group. In accordance with block 1208, the computed offset information and the timing information may be used to maintain proper audio synchronization among the playback devices in the synchrony group. For example, the first playback device 1004 may continuously receive audio data packets 1018 stamped with timing information (i.e., the "time-to-play" 1020). The device 1004 may then use the retrieved offset information 1104 to convert the timing information (i.e., "time-to-play" 1020) stamped on the audio data packet 1020 by the channel source into a time value that, when audio is played back according to the playback device's local clock, the audio is played back in synchrony with other playback devices in the synchrony group.

Note that retrieving stored clock offsets from a memory storage may expedite satisfactory audio synchronization in comparison to executing audio synchronization without previously saved clock offsets. This is the case for at least the reason that audio synchronization without previously saved clock offsets may require additional time to determine respective offsets between the playback devices.

X. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves audio synchronization of one or more playback devices using offset information. In one aspect, a method is provided. The method involves causing a first playback device to join a synchrony group upon a command, the synchrony group having a group coordinator that provides timing information for the synchrony group. The method also involves retrieving from a memory storage, by the first playback device, data representing an offset between a clock of the first playback device and a clock of the group coordinator, where the data representing the offset was placed in the memory storage prior to the command. The method further involves using, by the first playback device, the data representing the offset and the timing information to play audio with the synchrony group.

In another aspect, a non-transitory computer readable memory is provided. The non-transitory computer readable memory has stored therein instructions executable by a processor to cause the processor to perform functions. The functions include causing a first playback device to join a synchrony group upon a command, the synchrony group having a group coordinator that provides timing information for the synchrony group. The functions also include retrieving from a memory storage, by the first playback device, data representing an offset between a clock of the first playback device and a clock of the group coordinator, where the data representing the offset was placed in the memory storage prior to the command. The functions further include using, by the first playback device, the data representing the offset and the timing information to play audio with the synchrony group.

In yet another aspect, a system is provided. The system includes a first playback device, a second playback device, and a group coordinator. The first playback device has stored thereon instructions executable by a processor to cause the device to perform functions. The functions include causing a first playback device to join a synchrony group upon a command, the synchrony group having a group coordinator that provides timing information for the synchrony group. The functions also include retrieving from a memory storage, by the first playback device, data representing an offset between a clock of the first playback device and a clock of the group coordinator, where the data representing the offset was placed in the memory storage prior to the command. The functions further include using, by the first playback device, the data representing the offset and the timing information to play audio with the synchrony group.

In yet another aspect, a second method is provided. The method involves causing a first playback device to join a synchrony group upon a command, the synchrony group having a group coordinator that provides timing information for the synchrony group. The method also involves determining, by the first playback device, that data representing an offset between a clock of the first playback device and a clock of the group coordinator is not available in a memory storage. The method additionally involves computing, by the first playback device, the offset between the clock of the first playback device and the clock of the group coordinator. The method further involves using, by the first playback device, the offset and the timing information to play audio with the synchrony group.

In yet another aspect, a non-transitory computer readable memory is provided. The non-transitory computer readable memory has stored therein instructions executable by a processor to cause the processor to perform functions. The functions include causing a first playback device to join a synchrony group upon a command, the synchrony group having a group coordinator that provides timing information for the synchrony group. The functions also include determining, by the first playback device, that data representing an offset between a clock of the first playback device and a clock of the group coordinator is not available in a memory storage. The functions additionally include computing, by the first playback device, the offset between the clock of the first playback device and the clock of the group coordinator. The functions further include using, by the first playback device, the offset and the timing information to play audio with the synchrony group.

In yet another aspect, a system is provided. The system includes a first playback device, a second playback device, and a group coordinator. The first playback device has stored thereon instructions executable by a processor to cause the device to perform functions. The functions include causing a first playback device to join a synchrony group upon a command, the synchrony group having a group coordinator that provides timing information for the synchrony group. The functions also include determining, by the first playback device, that data representing an offset between a clock of the first playback device and a clock of the group coordinator is not available in a memory storage. The functions additionally include computing, by the first playback device, the offset between the clock of the first playback device and the clock of the group coordinator. The functions further include using, by the first playback device, the offset and the timing information to play audio with the synchrony group.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A first playback device comprising:
one or more processors; and
tangible, non-transitory computer-readable memory comprising instructions that, when executed by the one or more processors, cause the first playback device to perform functions comprising:
receiving, from a second playback device, data indicating clock information of the second playback device;
before receiving the data indicating the clock information, determining that data indicating an offset between a clock of the first playback device and a clock of the second playback device is not available in memory storage; determining an offset between a clock of the first playback device and a clock of the second playback device using the clock information of the second playback device storing, in the memory storage, data representing the offset;
receiving, from the second playback device, a first time corresponding to audio data to be played by the first playback device as part of a synchrony group with the second playback device;
retrieving, from the memory storage, the data representing the offset between the clock of the first playback device and the clock of the second playback device;
determining a second time based on (i) the first time and (ii) the retrieved data representing the offset; and
playing the audio data at the second time according to the clock of the first playback device.

2. The first playback device of claim 1, wherein the offset is a first offset, and wherein the functions further comprise:
after playing the audio data, determining a second offset between the clock of the first playback device and the clock of the second playback device, wherein the second offset is different from the first offset; and
replacing, in the memory storage, the retrieved data representing the first offset with data representing the second offset.

3. The first playback device of claim 1, wherein the first playback device comprises the memory storage, and wherein determining that data representing the offset is not available comprises:
determining that data indicating the offset is not written to the memory storage of the first playback device.

4. The first playback device of claim 1, wherein determining the offset between the clock of the first playback device and the clock of the second playback device comprises:
determining the offset while the first playback device is in the synchrony group with the second playback device.

5. The first playback device of claim 1, wherein determining the offset between the clock of the first playback device and the clock of the second playback device comprises:
determining the offset while the first playback device is not in a synchrony group with the second playback device.

6. The first playback device of claim 1, wherein determining the offset between the clock of the first playback device and the clock of the second playback device comprises:
determining data representing a linear offset between the clock of the first playback device and the clock of the second playback device.

7. The first playback device of claim 1, wherein determining the offset between the clock of the first playback device and the clock of the second playback device comprises:
determining data representing a rate offset between the clock of the first playback device and the clock of the second playback device.

8. The first playback device of claim 1, wherein the functions further comprise before receiving from the second playback device, the first time corresponding to the audio data, joining the synchrony group, and wherein the retrieving comprises after joining the synchrony group, retrieving the data representing the offset from the memory storage.

9. The first playback device of claim 1, wherein the second playback device is a group coordinator of the synchrony group.

10. Tangible, non-transitory computer-readable memory comprising instructions that, when executed by one or more processors, cause a first playback device to perform functions comprising:

receiving, from a second playback device, data indicating clock information of the second playback device;

before receiving the data indicating the clock information, determining that data indicating an offset between a clock of the first playback device and a clock of the second playback device is not available in memory storage; determining an offset between a clock of the first playback device and a clock of the second playback device using the clock information of the second playback device storing, in the memory storage, data representing the offset;

receiving from the second playback device, a first time corresponding to audio data to be played by the first playback device as part of a synchrony group with the second playback device;

retrieving, from the memory storage, the data representing the offset between the clock of the first playback device and the clock of the second playback device;

determining a second time based on (i) the first time and (ii) the retrieved data representing the offset; and playing the audio data at the second time according to the clock of the first playback device.

11. The tangible, non-transitory computer-readable memory of claim 10, wherein the offset is a first offset, and wherein the functions further comprise:

after playing the audio data, determining a second offset between the clock of the first playback device and the clock of the second playback device, wherein the second offset is different from the first offset; and replacing in the memory storage, the retrieved data representing the first offset with data representing the second offset.

12. The tangible, non-transitory computer-readable memory of claim 10, wherein the functions further comprise:

determining that data indicating the offset is not written to the memory storage of the first playback device.

13. The tangible, non-transitory computer-readable memory of claim 10, wherein determining the offset between the clock of the first playback device and the clock of the second playback device comprises:

determining the offset while the first playback device is in the synchrony group with the second playback device.

14. The tangible, non-transitory computer-readable memory of claim 10, wherein determining the offset between the clock of the first playback device and the clock of the second playback device comprises:

determining the offset while the first playback device is not in a synchrony group with the second playback device.

15. The tangible, non-transitory computer-readable memory of claim 10, wherein determining the offset between the clock of the first playback device and the clock of the second playback device comprises:

determining data representing a linear offset between the clock of the first playback device and the clock of the second playback device.

16. The tangible, non-transitory computer-readable memory of claim 10, wherein determining the offset between the clock of the first playback device and the clock of the second playback device comprises:

determining data representing a rate offset between the clock of the first playback device and the clock of the second playback device.

17. The tangible, non-transitory computer-readable memory of claim 10, wherein the functions further comprise before receiving the first time corresponding to the audio data, joining the synchrony group, and wherein the retrieving comprises after joining the synchrony group, retrieving the data representing the offset from the memory storage.

18. A method comprising:

receiving, via a first playback device from a second playback device, data indicating clock information of the second playback device;

before receiving the data indicating the clock information, determining, via the first playback device, that data indicating an offset between a clock of the first playback device and a clock of the second playback device is not available in memory storage; determining an offset between a clock of the first playback device and a clock of the second playback device using the clock information of the second playback device, and storing, via the first playback device in the memory storage, data representing the offset;

receiving, via the first playback device from the second playback device, a first time corresponding to audio data to be played by the first playback device as part of a synchrony group with the second playback device;

retrieving, from the memory storage, the data representing the offset between the clock of the first playback device and the clock of the second playback device;

determining, via the first playback device a second time based on (i) the first time and (ii) the retrieved data representing the offset; and playing, via the first playback device the audio data at the second time according to the clock of the first playback device.

19. The method of claim 18, wherein the offset is a first offset, and wherein the method further comprises:

after playing the audio data, determining, via the first playback device, a second offset between the clock of the first playback device and the clock of the second playback device, wherein the second offset is different from the first offset; and replacing, via the first playback device in the memory storage, the retrieved data representing the first offset with data representing the second offset.

20. The method of claim 18, further comprising:

determining that data indicating the offset is not written to the memory storage of the first playback device.

* * * * *